Figure 1:
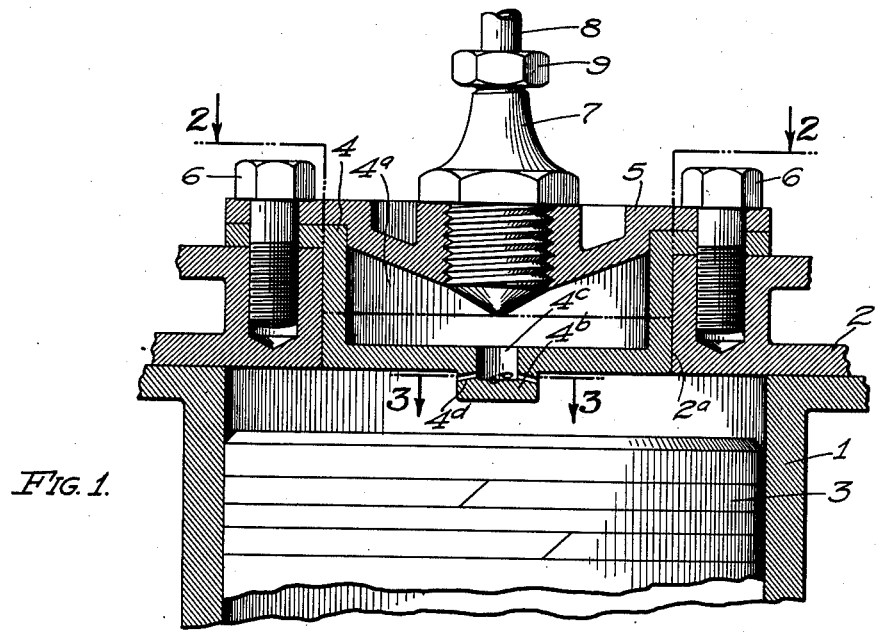

July 21, 1925.  1,546,836

W. H. HUNT

FUEL INJECTING AND GASIFYING MEANS FOR GAS ENGINES

Filed March 26, 1923

INVENTOR.
WILLIAM H HUNT.
BY A.B.Bowman
ATTORNEY

Patented July 21, 1925.

1,546,836

UNITED STATES PATENT OFFICE.

WILLIAM H. HUNT, OF NATIONAL CITY, CALIFORNIA.

FUEL INJECTING AND GASIFYING MEANS FOR GAS ENGINES.

Application filed March 26, 1923. Serial No. 627,786.

*To all whom it may concern:*

Be it known that I, WILLIAM H. HUNT, a citizen of the United States, residing at National City, in the county of San Diego and State of California, have invented a certain new and useful Fuel Injecting and Gasifying Means for Gas Engines, of which the following is a specification.

My invention relates to internal combustion engines, more particularly to the high pressure type in which liquid fuel is used and atomized as it is injected into the engine cylinder, and the objects of my invention are: First, to provide a fuel injector means in connection with an engine of this class which will thoroughly atomize and gasify the liquid fuel after it leaves the fuel nozzle; second, to provide such means of communication between the primary and main combustion chambers by which the velocity of the hot air from the main combustion chamber, forced into the primary combustion chamber, is increased to the highest possible degree and set into a whirling and intermingling motion, thereby facilitating the atomizing and gasifying of the fuel, and also by which communicating means, the velocity of the atomized and gasified liquid fuel charge as it enters the main combustion chamber is increased to a high degree, thereby giving better penetration and turbulence of the gases and therefore better combustion; third, to provide a primary combustion chamber, so constructed that it will be well scavenged at each stroke of the piston; fourth, to provide an air inlet in which the air is forced through orifices at an angle to the radii of a recess into which the fuel is directed, providing a whirling motion, thereby facilitating the atomizing and gasifying of the fuel charge; fifth, to provide a primary combustion chamber so constructed that the primary or partial combustion takes place at the central portion thereof and by the increase of pressure caused thereby, the fuel or partly burned fuel will be forced into the main combustion chamber and not mixed substantially with the outer cushion of air; sixth, to provide a liquid fuel atomizing and gasifying means in connection with internal combustion engines of the class described which will not accumulate carbon deposits; seventh, to provide a novelly constructed means of this class, and eighth, to provide a device of this class which is very simple and economical of construction, durable, efficient, easy to install, and which will not readily deteriorate or get out of order.

Figure 2:
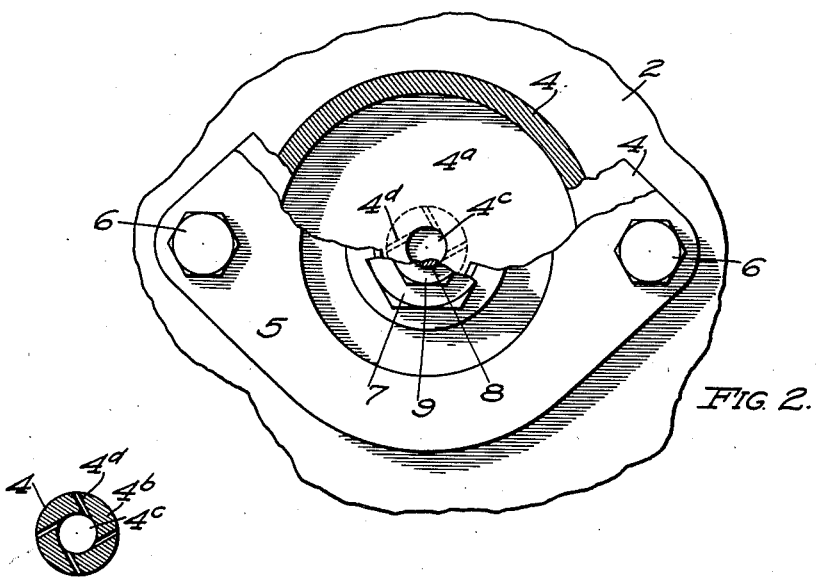
Figure 3:
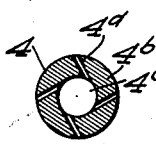

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, which form a part of this application, in which:

Figure 1 is a fragmentary sectional view of an engine cylinder taken through the middle thereof with a piston in position therein and with my device secured to the upper end thereof; Fig. 2 is a plan view showing the engine head fragmentarily and showing a portion broken away and in section through 2—2 of Fig. 1, and Fig. 3 is a sectional view taken through 3—3 of Fig. 1, showing in detail the communicating means between the primary and main combustion chambers.

Like characters of reference refer to similar parts and portions throughout the several views of the drawings.

The engine cylinder 1, cylinder head 2, piston 3, primary combustion chamber member 4, nozzle supporting member 5, bolts 6, nozzle 7, fuel supply conductor 8, and the nut 9, constitute the principal parts and portions of my structure.

The cylinder 1 and piston 3 are of the conventional construction, and the cylinder head 2 is secured to the upper portion of the cylinder in the conventional manner. Said cylinder head is provided with a central opening $2^a$ in which is adapted to fit snugly the primary combustion chamber members 4, the extended portion of which extends downwardly substantially flush with the inner wall of the cylinder head. This member 4 is hollow at its upper portion, forming the primary combustion chamber $4^a$. The bottom wall of the member 4 forms the separating wall between the primary and main combustion chambers, at the central portion of which wall is provided a communicating means between said chambers which consists of a downwardly offset portion 4ᵇ, the opening 4ᵉ formed by said offset portion being in its upper side and communicating at its lower portion with the main combustion chamber of the cylinder by the substantially horizontal, angularly positioned orifices 4ᵈ. The upper wall of the primary combustion chamber is formed by the nozzle supporting member 5, the central portion of which is inclined downwardly and inwardly, making the outwardly extending portion of the primary combustion chamber of greater depth. Said members 4 and 5 are secured to the cylinder head by the screws 6 extending through the extended flange portions of the same. The nozzle 7 is screwed into the central portion of the member 5 from the upper side thereof and is connected at its other end by means of the conductor 8 which is secured to the nozzle 7 by means of the nut 9 to a supply of liquid fuel under pressure. The central hole connects the conductor 8 with the inside of the primary combustion chamber, the lower end of which is positioned in substantially close proximity to the upper portion of the recess 4ᶜ which is connected to the primary combustion chamber as previously described.

It is obvious from this construction as described and shown that as air is compressed in the main combustion chamber in the cylinder 1, a portion of this air will be forced into the primary combustion chamber and through the orifices 4ᵈ of the member 4 with high velocity, and as the pressure in the primary combustion chamber during the compression stroke of the engine piston 3 will not be as high at any time as it is in the main combustion chamber, air will continue to flow into the primary combustion chamber through the orifices after the piston 3 has reached its top center, and therefore continue to atomize and gasify the liquid fuel. Shortly before the engine piston 3 reaches the end of its upward stroke, liquid fuel is forced out of the fuel nozzle 7 in a fine stream which meets the whirling, oppositely approaching air of high velocity which has been heated to a high temperature by the cylinder walls and compression; thus the liquid fuel is readily atomized and thoroughly gasified.

As air has been entering the primary combustion chamber during the whole of the compression stroke of the engine piston 3, there is sufficient oxygen in the primary combustion chamber to produce initial or partial combustion which raises the pressure in the primary combustion chamber in excess of that in the main combustion chamber, forcing the partly burned gases, fuel and oxygen into the main combustion chamber with great velocity through the orifices 4ᵈ, and the streams of gas penetrate every portion of the combustion chamber and intermingle, thereby attaining good combustion of the fuel.

The scavenging of the primary combustion chamber is accomplished by the fuel being atomized in the center of the primary chamber in close proximity to the communicating passage between the separate chambers and a wall of air is provided at the exterior portions of the primary combustion chamber; thus all of the atomized and gasified fuel is driven out of the primary combustion chamber ahead of the other surrounding gases.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In an internal combustion engine, a cylinder having a main combustion chamber and a primary combustion chamber, a partition separating said chambers provided with a central recess extending centrally from the primary combustion chamber and provided with orifices positioned at an angle with the radii, both vertically and horizontally, of said recess, connecting said main combustion chamber with said recess communicating with said primary combustion chamber, whereby the air passing from the main to the primary combustion chamber is caused to whirl and thoroughly break up and atomize the fuel.

2. In an internal combustion engine, a cylinder having a main combustion chamber at one end, a head for said cylinder, and a primary combustion chamber secured to said head, said primary combustion chamber having in its middle portion an air nozzle connecting said combustion chambers, said air nozzle consisting of a wall with a recess in the central part of the lower side of said primary combustion chamber, said recess communicating with said main combustion chamber by means of a plurality of laterally extending orifices positioned at an angle with the radii, both vertically and horizontally, of said recess.

3. In an internal combustion engine, a cylinder having a main combustion chamber, a head for said cylinder having a primary combustion chamber with a central recess extending centrally therefrom and with orifices positioned tangentially at an angle with the radii, both vertically and horizontally, of said recess, connecting said main combustion chamber with said recess.

4. In an internal combustion engine, a cylinder having a main combustion chamber, a head for said cylinder having a primary combustion chamber with a central recess extending centrally therefrom and with orifices positioned at an angle with the radii, both vertically and horizontally, of said recess, connecting said main combustion chamber with said recess, and a fuel nozzle in close proximity and directed toward said recess.

In testimony whereof, I have hereunto set my hand at San Diego, California, this 18th day of March, 1923.

WILLIAM H. HUNT.